No. 630,861. Patented Aug. 15, 1899.
C. A. CONNER.
DOUGH MIXING MACHINE.
(Application filed Apr. 15, 1899.)
(No Model.)
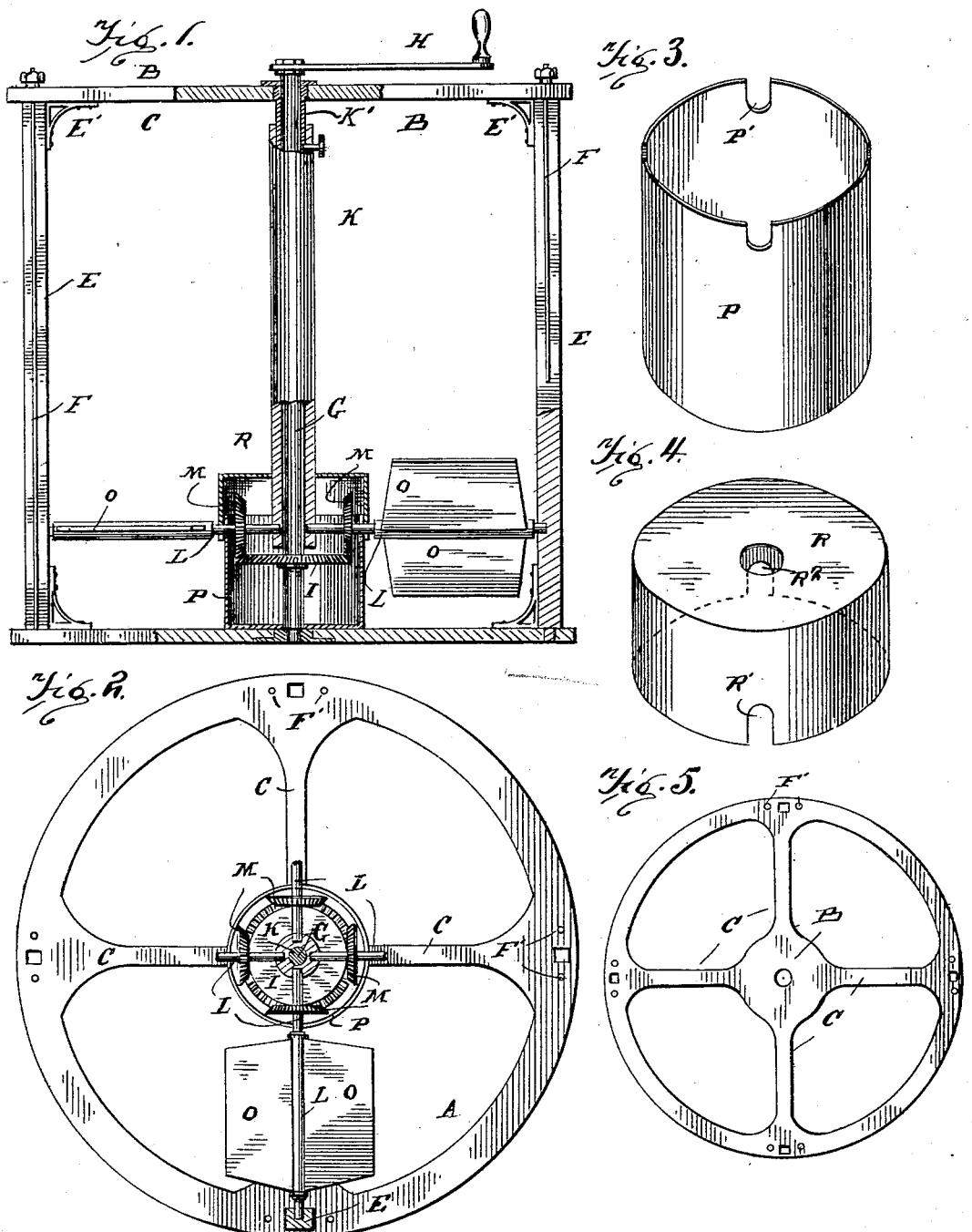
WITNESSES
Chas. K. Davies.
D. J. Gibbon.
INVENTOR
C. A. Conner
By W. A. Bartlett
Attorney

UNITED STATES PATENT OFFICE.

CHARLES ADSON CONNER, OF WARSAW, NEW YORK, ASSIGNOR TO R. B. O'NEILL, OF MARION, INDIANA.

DOUGH-MIXING MACHINE.

SPECIFICATION forming part of Letters Patent No. 630,861, dated August 15, 1899.

Application filed April 15, 1899. Serial No. 713,164. (No model.)

*To all whom it may concern:*

Be it known that I, CHARLES ADSON CONNER, a citizen of the United States, residing at Warsaw, in the county of Wyoming and State of New York, have invented certain new and useful Improvements in Dough-Mixing Machines, of which the following is a specification, reference being had therein to the accompanying drawings.

This invention relates to machines for mixing dough or batter.

The object of the invention is to produce a machine which can be introduced into a tub or trough containing batter or dough not too stiff and which will operate to beat up or mix the compound. In the same way the machine may be used as a churn or an egg-beater.

Figure 1 is a partial elevation and partial vertical section of the machine. Fig. 2 is a horizontal section just above the driving-gears, parts being omitted or broken away. Fig. 3 is a perspective of the cup for inclosing the bottom of gearing. Fig. 4 is a perspective of the cup for inclosing the top of the gearing. Fig. 5 is a plan, on reduced scale, of the top ring or spider.

A indicates the bottom ring or spider, and B the top ring or spider. The rings or spiders have cross-bars C C and central bearings for the main driving-shaft D.

Four posts or standards E are shown, which posts when the machine is assembled extend between the spiders A B, the whole being held together by mortise-and-tenon connections and by rods F F, passing through holes F' F' in the spiders and held in place by bolt-heads and nuts, as is common in binding structures together with tie-rods. The posts or standards E have brackets E' thereon to brace the structure and give it rigidity. A shaft G has bearings in the spiders, so that it is free to turn when driven by the crank H. A bevel gear-wheel I is attached to shaft G, near the bottom of said shaft, so as to rotate therewith. A sleeve K is placed around the shaft G and secured to the upper spider B. Sleeve K may be secured directly to the spider, but preferably an inner short bushing K' is connected to the spider by a screw or other usual connection, and sleeve K is fastened to this bushing by any suitable holding device, a set-screw being shown. The sleeve K is thus rigid with the bushing when in use, but the parts may be readily detached. This sleeve K does not rotate, but has near its lower end bearings for the journals of four radial shafts L L L L. The outer ends of these shafts are supported in bearings in the posts E. Each of these shafts L carries a fixed bevel-gear M in position to engage the main driving-gear I, by which means the shafts will be rotated when the crank H is turned. Each shaft L is provided with two or more blades or beaters O, which operate as beaters or stirrers to the dough or batter to be worked. The lower end of the main shaft and the gears are inclosed or partly inclosed in an inverted cup P, which cup has a hole in its bottom for the passage of shaft G and notches P' in its sides, which notches fit neatly around the shafts L, so as to inclose the gearing, but to leave the beaters on the outside of the cup. A second cup or cover R fits over the top of the gears, having a central passage $R^2$ for the sleeve K, and notches R' to embrace the shafts L. All the driving-gears are thus inclosed in a closed vessel formed of these two cups, which keep the dough or batter from the gearing.

As the bottom spider and sides of the machine are mainly open the machine can be placed in a tub or trough containing batter or dough not too stiff, and the batter or dough will rise inside the spider and can then be operated on by the beaters O. As the dough or batter is kept out of the gearing it is but little work to clean the machine after using. In operation it is very efficient as a beater and can be applied in any suitable vessel in which the material or batter to be stirred or beaten is inclosed.

What I claim is—

1. In a dough-mixer, the combination of an open framework, a central driving-shaft and radial shafts arranged in the framework and having beaters thereon, and driving-gears connected to the driving-shaft and radial shafts, said gears inclosed in a removable box which in its operating position closes around the shafts, substantially as described.

2. In a dough-mixer, the top and bottom spiders, posts or standards, and binding-rods by which the frame is rigidly held, the central shaft having a bevel-gear thereon, a sleeve surrounding said shaft, the radial shafts having bearings in said sleeve and in the standards, and bevel-gears on the central and radial shafts as described, and means for excluding the dough from such gearing, all combined substantially as described.

3. In a dough-mixer, the combination with the open frame, central driving-shaft, and radial shafts extending from near the center to the frame and carrying beaters, of the gearing by which said shafts are connected, and an inclosing vessel for said gears consisting of two cups having bottom openings and notched sides, and arranged with relation to the gears substantially as described.

In testimony whereof I affix my signature in presence of two witnesses.

CHARLES ADSON CONNER.

Witnesses:
S. W. LAMBERSON,
C. W. KNAPP.